United States Patent
Han et al.

[11] Patent Number: 5,930,722
[45] Date of Patent: Jul. 27, 1999

[54] DIGITAL MOBILE COMMUNICATION SYSTEM AND TIMING DESIGN METHOD BETWEEN VARIOUS SUBSYSTEMS

[75] Inventors: Jin Soo Han; Byong Jin Cho, both of Daejeon-shi, Rep. of Korea

[73] Assignee: Hyundai Electronics Industries Co. Ltd., Seoul, Rep. of Korea

[21] Appl. No.: 08/603,898

[22] Filed: Feb. 22, 1996

[30] Foreign Application Priority Data

Mar. 7, 1995 [KR] Rep. of Korea .................. 95-4578

[51] Int. Cl.[6] .................. H04Q 7/20; H04Q 7/30; H04Q 7/28
[52] U.S. Cl. .................. 455/502; 455/500; 455/524; 455/442; 455/561
[58] Field of Search .................. 455/502, 500, 455/524, 13.1, 13.2, 442, 561, 560, 450, 432, 434, 436, 438, 439; 370/337; 375/356

[56] References Cited

U.S. PATENT DOCUMENTS

| | | |
|---|---|---|
| 5,195,091 | 3/1993 | Farwell et al. .................. 455/502 |
| 5,343,498 | 8/1994 | Toy et al. .................. 370/337 |
| 5,550,992 | 8/1996 | Hashimoto .................. 455/422 |
| 5,574,983 | 11/1996 | Douzono et al. .................. 455/524 |
| 5,640,386 | 6/1997 | Wiedeman .................. 455/13.1 |
| 5,664,006 | 9/1997 | Monte et al. .................. 455/405 |

*Primary Examiner*—Wellington Chin
*Assistant Examiner*—Keith Ferguson
*Attorney, Agent, or Firm*—Fish & Richardson P.C.

[57] ABSTRACT

A digital mobile communication system wherein a master clock of a mobile communication system for offering audio or data service using a code division multiple access (CDMA) is set as a global positioning system (GPS) clock provided in a GPS and the interface and timing between various subsystems using the GPS clock and an exchanger are redesigned to achieve an exact timing schedule, and a timing design method between various subsystems. In order to maintain frequency and time synchronization between various subsystems in a CDMA system using an exchanger therefor, the respective subsystems are designed based on the clock supplied from a GPS, a hardware interconnection between the systems is designed based on the GPS clock to attain an exact timing, thereby achieving a fast and exact frame transmission.

10 Claims, 3 Drawing Sheets

DIGITAL MOBILE COMMUNICATION SYSTEM AND TIMING DESIGN METHOD BETWEEN VARIOUS SUBSYSTEMS

BACKGROUND OF THE INVENTION

The present invention relates to a digital mobile communication system and a timing design method between various subsystems, and more particularly, to a digital mobile communication system wherein a master clock of a mobile communication system for offering audio or data service using a code division multiple access (CDMA) is set as a global positioning system (GPS) clock provided in a GPS and the interface and timing between various subsystems using the GPS clock and an exchanger are redesigned to achieve an exact timing schedule, and a timing design method between various subsystems.

In general, all existing exchangers and various subsystems connected thereto adopt a frequency synchronizing method to match a timing synchronization because they simply transmit a message (information), without any need for another synchronizing methods.

However, the existing communication methods are changing from cable methods to wireless ones, and from analog methods to digital ones.

Accordingly, there have been developing an exchanger, a control station and a base station using the CDMA method. The control station for a CDMA used for mobile communication requires a timing synchronizing method for determining concurrently input signals from two base stations, i.e., determining whether the signals are input concurrently, when the respective subscribers' terminals are moved during transmission/reception (a hand-off state).

The mobile communication system using the exchanger for CDMA adopts a timing sync method as well as a frequency synchronizing method in the timing synchronizing method between the control station and various subsystems connected thereto.

Here, the frequency synchronization is a basic function for preventing data loss or error in all the digital systems, for implementing its function by defining a master clock and extracting its own clock using a slave mode in the respective subsystems to then function in accordance with the clock. The time synchronization is used for transmitting frames from two base stations to one mobile terminal during a soft hand-off state, transmitting frames from two base stations to one base station controller to sort frames in the base station controller having received the frames and for minimizing a round trip delay.

SUMMARY OF THE INVENTION

Therefore, it is an object of the present invention to accomplish an exact frame transmission by providing a plurality of base stations to which subscribers' terminals are enrolled in a mobile communication system using an exchanger for a CDMA, by providing a base station controller for controlling a call occurring between the base stations and an exchanger and taking charge of the hindrance monitoring of the respective systems, the maintenance, hand-off treatment, various types of control, and matching between the exchanger and the respective base stations, and by providing a timing design method for timing synchronization.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
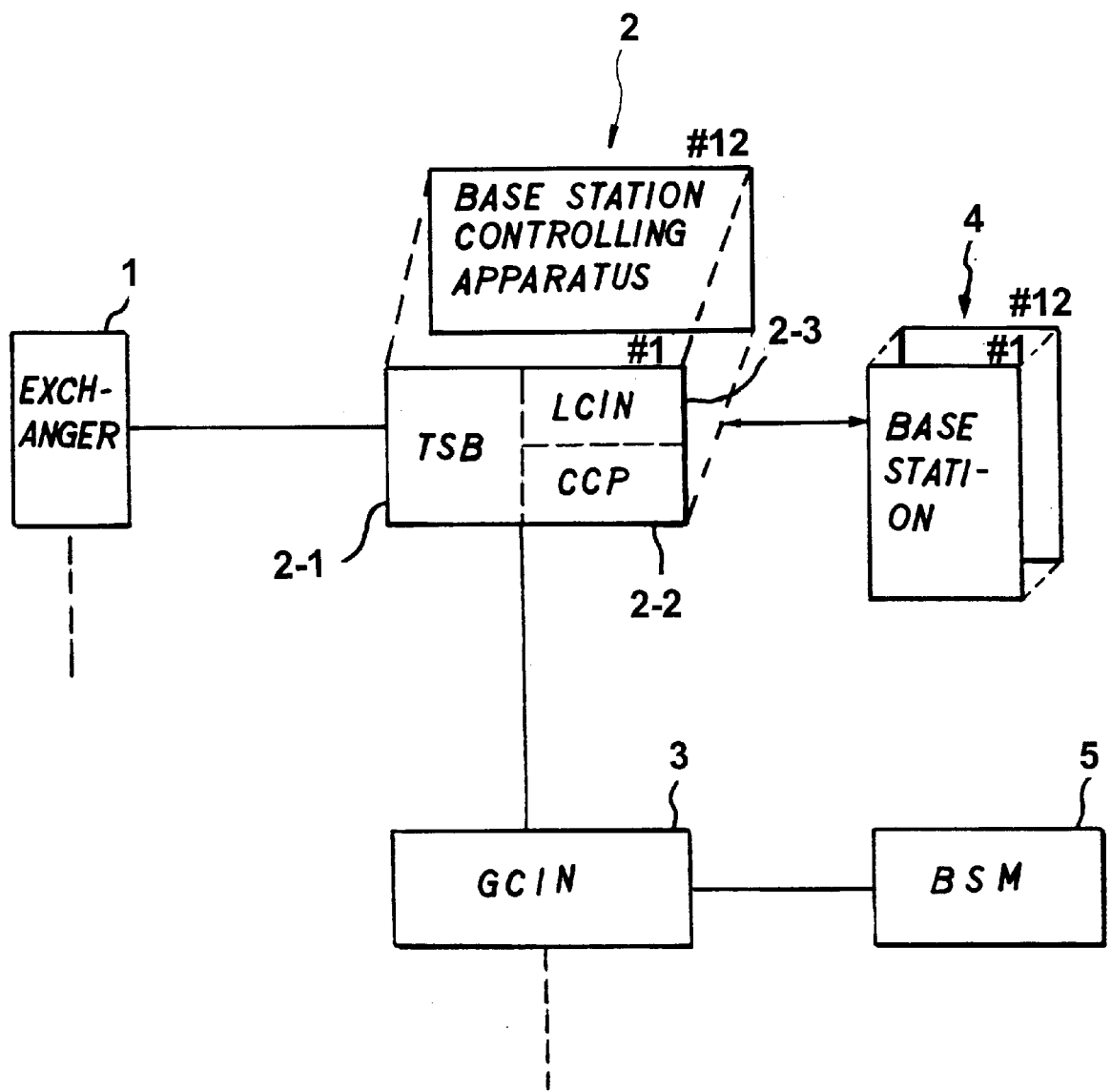
FIG. 1 is an overall schematic diagram of a code division multiple access (CDMA) system according to the present invention.

Referring to FIG. 1, the CDMA system according to the present invention includes an exchanger 1, a base station controlling apparatus 2 having twelve base station controller groups (BSCG #1 through #12) having 1920 channels for each group, a second interface (global CDMA interconnection network: GCIN) 3 for interfacing between the respective twelve groups of station controlling apparatus 2, a base station 4 having twelve base station transceiver subsystem groups (BTSG #1 through #12) corresponding to the respective BSCG #1 through #12 of base station controlling apparatus 2, respectively, and a base station manager (BSM) 5 connected to second interface 3 for performing statistics and measurement of base station controlling apparatus 2 and peripheral equipments to manage the system performance, collecting alarm signals of base station controlling apparatus 2 to display the same on an operator matching device, or performing a direct hindrance repair.

Each of base station controller groups BSCG #1 through #12 includes 32 transcoding subsystem banks (TSB) 2-1 having four selectors each having 15 traffic channels for selecting signals from two base stations during a soft hand-off state to transmit good quality packets and performing a signal information exchange function such as a call set by being connected to exchanger 1, a call control processor (CCP) 2-2 for supervising the formation of a call while setting the call between plurality of base stations 4 and exchanger 1, and a first interface (local CDMA interconnection network (LCIN)) 2-3 for setting and supplying a traffic amount between base station controlling apparatus 2 and base stations 4 and a patrol packet path and performing the matching between base station controlling apparatus 2 and base stations 4.

By the aforementioned configuration, since each of base station controller groups BSCG #1 through #12 includes 32 transcoding subsystem banks (TSB) 2-1, the number of channels are 1920 (60 channels (4×15)×32).

The configuration of base stations will now be described in more detail. The traffic channels of a base station transceiver subsystems (BTS) are set as 20 and 16 BTS are formed on a basis of 2 FAs and 3 sectors, to have 1920 traffic channels for each BTS group. The BTS groups correspond with the respective station controller groups BSCG #1 through #12 of base station controlling apparatus 2 one by one, to form 12 groups #1 through #12 (3×2×20×16=1920 traffic channels).

Figure 2:
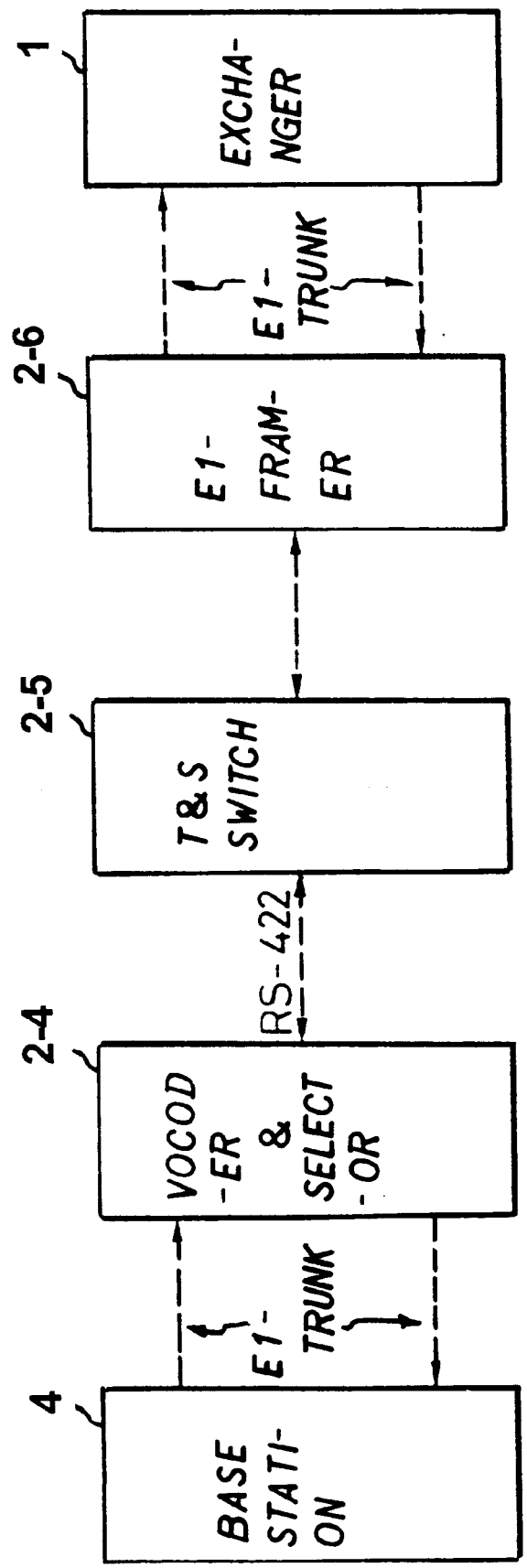
FIG. 2 is a block diagram showing parts in charge of interface between an exchanger for the CDMA system and a base station in a base station controller.

FIG. 2 is a block diagram showing parts in charge of interface between exchanger 1 for CDMA system and base stations 4 in a base station controlling apparatus 2, which include base stations 4, a vocoder & selector 2-4 connected to base stations 4 for selecting data transmitted/received to/from an exchanger 1 and coding/decoding the same, a time and space (T&S) switch 2-5 for performing a proper switching between vocoder & selector 2-4 and an E1-framer 2-6, and E1-framer 2-6 for compensating a PCM sample slip generated due to the matching between base stations 4 and exchanger 1, and exchanger 1, the portion between exchanger 1 and E1-framer 2-6, and the portion between base stations 4 and vocoder & selector 2-4 are linked using an E1-trunk. The portion between vocoder & selector 2-4 and T&S switch 2-5 is linked using an RS-422 interface.

Figure 3:
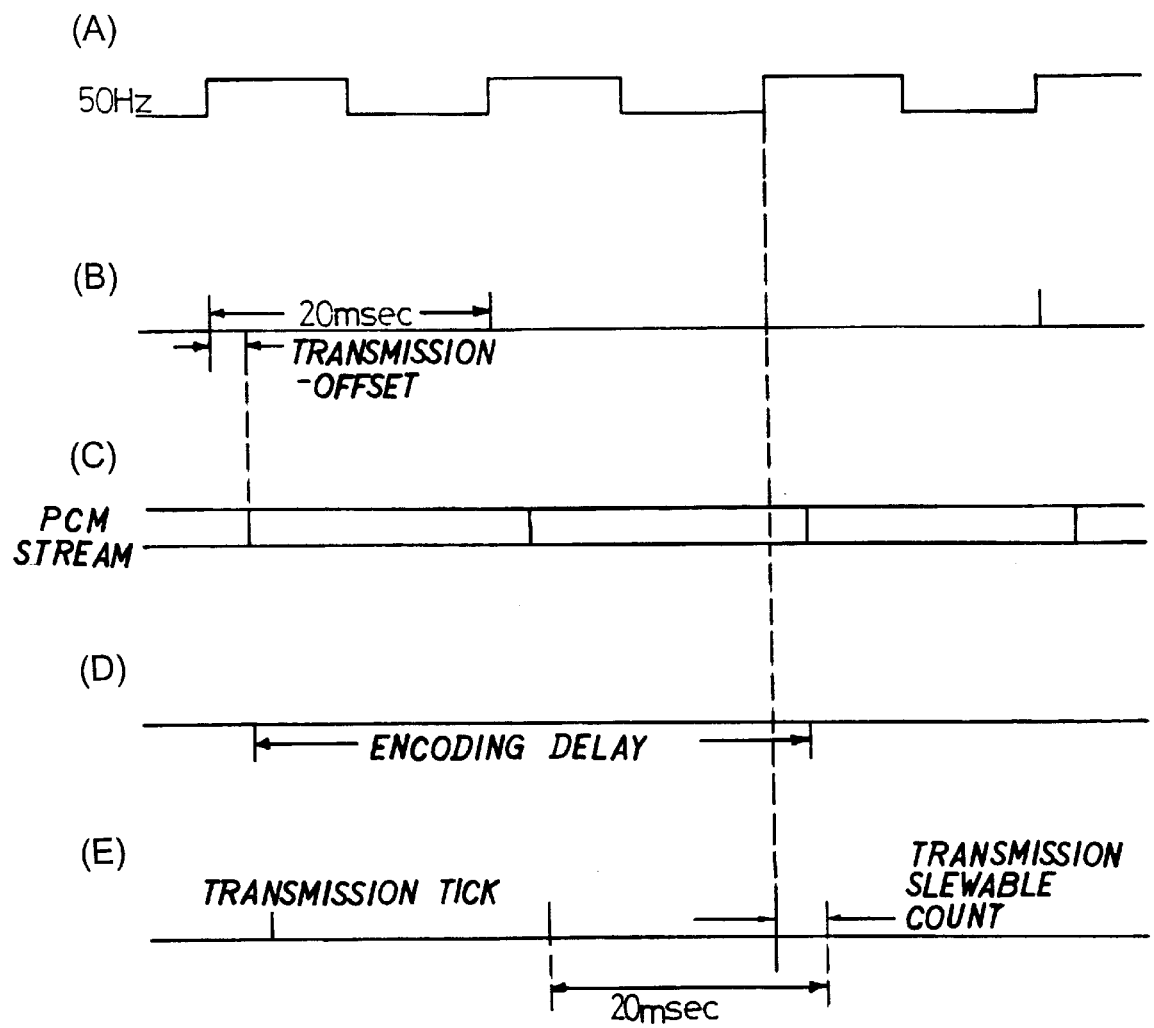
FIG. 3 is a timing diagram showing a transmission process of the CDMA system according to the present invention.

The process of transmitting signals between plurality of base stations 4 and exchanger 1 through the interface having the aforementioned configuration will be described with reference to FIG. 3. In the CDMA system according to the present invention, a common CDMA system time is used by the GPS, and the reference clock of 50 Hz supplied from the GPS is set as a master clock, as shown in FIG. 3A, for synchronization (50 Hz is 20 milliseconds needed for transmission of one frame).

First, the data flow in a forward link is as follows.

If the pulse coded modulation (PCM) data of 64 Kbps is transmitted from exchanger 1 to base station controlling apparatus 2, the transmitted data stream is converted in the base unit of transmitted frames used in the CDMA system to be transmitted, as shown in FIGS. 3B and 3C. In other words, a PCM sample received for each 125 $\mu$sec from vocoder & selector 2-4 of base station controlling apparatus 2 is collected to be 160, thereby forming a frame of 20 msec.

At this time, a strobe signal activated in vocoder & selector 2-4 is 20 msec, one cycle of a reference frequency. The transmission-offset (TX_OFFSET) is received with slightly lagging, as shown. When the transmission-offset is activated, the PCM stream is read in (shown in a dotted line).

The PCM stream, i.e., 160 samples of the transmitted frame, is encoded and is then transmitted to the corresponding base station 4 when a transmission tick (TX TICK) is activated, as shown in FIG. 3E. At this time, the encoded transmission frame is transmitted to vocoder & selector 2-4 (a selector side reads in the frame data stored in a vocoder side in accordance with a transmission slewable (TX SLEWABLE) counted value indicating of a point of time for reading the frame data.). Selector side having received the transmission frame transmits the data so that the frame is received in accordance with the CDMA transmission time of base station 4, thereby minimizing the delay.

Also, the point of time for transmitting the frame from selector side 2-4 to base station 4 is adjusted by the transmission slewable (TX SLEWABLE) counted value, which is determined by calculating the transmission delay time by exchanging the time synchronizing signal between selector side 2-4 and base station 4 when a call link is terminated and then a traffic channel is occupied. Since the first frame is input as 20 msec to be encoded, the second frame is input at the point when the encoded data is output and then the third frame is input, the encoding delay period shown in FIG. 3D is about 2 frames.

On the contrary, the data flow in a reverse link is opposite to that of the transmission side. The reception slewable (RX SLEWABLE) counted value is the time difference from a vocoder reference strobe (VRS) to a point of reception tick activation, that is, the time when the encoded frame transmitted from base station 4 is transmitted from selector side to vocoder, is delayed by the reception-offset (RX_OFFSET) and is decoded to be loaded on a trunk as the PCM stream. The reason why the PCM sample slip is generated is that the clock used as the reference clock in the currently being used exchanger is the one supplied from the standard research institute, so that a discrepancy of frequency synchronization is generated between the GPS clock used in base station 4 and base station controlling apparatus 2. In other words, 50 Hz for vocoder & selector 2-4 and 2.048 MHz (8 KHz frame sync) for exchanger interface are both used as the GPS clocks.

The vocoding method in the currently developing CDMA system adopts a "QCELP" method, which is implemented by a digital signal processor 1616 (DSP1616) proposed by AT&T.

Also, the time for cordless transmission of frames from each base station 4 to a plurality of terminals subscribed thereto is predetermined by a CDMA system time. The transmission/reception time of the terminals is variably determined since the synchronization signal is detected from the frames. Accordingly, the reception time from base station 4 is changed, and the transmission time to base station controlling apparatus 2 is determined by a fixed delay value of the transmission time of base station 4.

Therefore, it is possible to minimize errors generated when frame transmission is delayed or frames are back-transmitted in a packet louter, the frames are not received so as to be suitable for the CDMA transmission time.

As described above, according to the present invention, in order to maintain frequency and time synchronization between various subsystems in a CDMA system using an exchanger therefor, the respective subsystems are designed based on the clock supplied from a GPS, a hardware interconnection between the systems is designed based on the GPS clock to attain an exact timing, thereby achieving a fast and exact frame transmission.

What is claimed is:

1. A digital mobile communication system comprising:

an exchanger;

a base station controlling apparatus having twelve base station controller groups, each base station controller group having 1920 channels, the base station controlling apparatus having a first interface connected to said base station controller groups;

a base station having twelve base station transceiver subsystem groups corresponding to said base station controller groups of said base station controlling apparatus;

a base station manager connected to said first interface for performing statistics and measurement of said base station controlling apparatus and peripheral equipment for managing the system performance, collecting alarm signals of said base station controlling apparatus to display the same on an operator matching device, and performing a direct hindrance repair;

a base station controlling apparatus including 32 transcoding subsystem banks having four selectors each selector having 15 traffic channels the base station controlling apparatus capable of selecting signals from two of the transceiver subsystem groups during a soft hand-off state to transmit digital packets and perform a signal information exchange function;

a call control processor for supervising the formation of a call while setting the call between said base stations and said exchanger;

a second interface for setting and supplying a traffic amount between said base station controlling apparatus and said base stations; and a patrol packet path for performing the matching between said base station controlling apparatus and said base stations.

2. A digital mobile communication system comprising:

an exchanger;

a base station controlling apparatus having twelve base station controller groups, each base station controller group having 1920 channels, the base station controlling apparatus having a first interface connected to said base station controller groups;

a base station having twelve base station transceiver subsystem groups corresponding to said base station controller groups of said base station controlling apparatus;

a base station manager connected to said first interface for performing statistics and measurement of said base station controlling apparatus and peripheral equipment for managing the system performance, collecting alarm signals of said base station controlling apparatus to display the same on an operator matching device, and performing a direct hindrance repair;

a matching portion controlling a second interface between said exchanger and said base station includes a vocoder & selector connected to said base stations; and a time and space switch for switching between said vocoder & selector and an E1-framer, the E-1 framer compensating a PCM sample slip generated due to the matching between said base stations and said exchanger.

3. A digital mobile communication system having an exchanger and a base station comprising:

a base station controller connected along signal paths between the exchanger and the base station, the base station controller having a plurality of transcoding subsystem banks for selecting signals from first and second base transceiver groups of the base station during a soft hand-off state, the base station having a call control processor for setting the call between the base station and the exchanger, and a first interface connected along a patrol packet path for matching signals from the base station and the base station controlling apparatus.

4. The system of claim 3 wherein the base station further includes a plurality of transceiver groups each having a plurality of channels and wherein the base station controlling apparatus further includes a plurality of base station controller groups each having a plurality of channels.

5. The system of claim 3 wherein the base station further includes twelve transceiver groups each having 1,920 channels and wherein the base station controlling apparatus further includes twelve base station controller groups each having 1,920 channels.

6. The system of claim 3 further including a base station manager connected to a second interface for performing statistics and measurement of the base station controlling apparatus and peripheral equipment to manage the system performance, collecting alarm signals of the base station controlling apparatus to display the same on an operator matching device, and performing a direct hindrance repair.

7. A digital mobile communication system having an exchanger and a base station comprising:

a first signal of the base station and a second signal of the base station, the first and second signals having a common origin, and an interface between the exchanger and the base station, the interface including a vocoder, the interface further including a time and space switch for switching between the vocoder and a framer, the switch compensating a signal slip generated by the interface when matching the first and second signals.

8. The system of claim 7 wherein the base station further includes a first plurality of transceiver groups each having a second plurality of channels and wherein the base station controlling apparatus further includes a first plurality of base station controller groups each having a second plurality of channels.

9. The system of claim 7 wherein the base station further includes twelve transceiver groups each having 1,920 channels and wherein the base station controlling apparatus further includes twelve base station controller groups each having 1,920 channels.

10. The system of claim 7 further including a base station manager connected to a second interface for performing statistics and measurement of the base station controlling apparatus and peripheral equipment to manage the system performance, collecting alarm signals of the base station controlling apparatus to display the same on an operator matching device, and performing a direct hindrance repair.

* * * * *